(12) United States Patent
Bulbarello et al.

(10) Patent No.: US 11,278,044 B2
(45) Date of Patent: *Mar. 22, 2022

(54) IRON SUPPLEMENTATION OF A BOUILLON CONCENTRATE

(71) Applicant: DSM IP ASSETS B.V., Heerlen (NL)

(72) Inventors: Andrea Bulbarello, Kaiseraugst (CH); Georg Steiger, Kaiseraugst (CH)

(73) Assignee: DSM IP ASSETS B.V., Heerlen (NL)

( * ) Notice: Subject to any disclaimer, the term of this patent is extended or adjusted under 35 U.S.C. 154(b) by 37 days.

This patent is subject to a terminal disclaimer.

(21) Appl. No.: 14/914,042

(22) PCT Filed: Aug. 7, 2014

(86) PCT No.: PCT/EP2014/066977
§ 371 (c)(1),
(2) Date: Feb. 24, 2016

(87) PCT Pub. No.: WO2015/028272
PCT Pub. Date: Mar. 5, 2015

(65) Prior Publication Data
US 2016/0213043 A1    Jul. 28, 2016

(30) Foreign Application Priority Data
Aug. 28, 2013    (EP) .................................... 13181928

(51) Int. Cl.
*A23L 23/10* (2016.01)
*A23L 33/16* (2016.01)

(52) U.S. Cl.
CPC .............. *A23L 23/10* (2016.08); *A23L 33/16* (2016.08)

(58) Field of Classification Search
CPC ........ A23L 23/10; A23L 33/10; A23L 33/165; A23L 33/16; A23L 33/105; A23V 2250/032
See application file for complete search history.

(56) References Cited

U.S. PATENT DOCUMENTS

| 5,670,344 A * | 9/1997 | Mehansho ............... A23G 1/56 426/593 |
| 6,616,955 B2 | 9/2003 | Nunes et al. |
| 2006/0134227 A1 * | 6/2006 | Bortz ..................... A61K 31/19 424/646 |
| 2009/0023686 A1 * | 1/2009 | McCall, Jr. .......... A61K 31/194 514/106 |
| 2009/0124572 A1 * | 5/2009 | Nelson .................. A23L 33/165 514/52 |
| 2012/0189692 A1 * | 7/2012 | Cullen ................... A61K 33/26 424/452 |
| 2013/0330459 A1 | 12/2013 | Steiger |
| 2015/0320091 A1 * | 11/2015 | Bulbarello ............ A23L 1/1008 426/73 |

FOREIGN PATENT DOCUMENTS

| EP | 1 743 5 30 | 8/2011 | |
| NL | 2497380 A1 * | 9/2012 | ............. A23L 1/304 |
| WO | WO 2009/068378 | 6/2009 | |
| WO | WO 2010/086192 | 8/2010 | |

OTHER PUBLICATIONS

International Search Report for PCT/EP2014/066977 dated Nov. 10, 2014, four pages.
Written Opinion of the ISA for PCT/EP2014/066977 dated Nov. 10, 2014, six pages.
Roe et al., "Relative bioavailability of micronized, dispersible ferric pyrophostate added to an apple juice drink", *European Journal of Nutrition*, vol. 48, No. 2, Jan. 13, 2009, pp. 115-119.
International Search Report for PCT/EP2014/066979 dated Oct. 24, 2014.
Written Opinion of the ISA for PCT/EP2014/066979 dated Oct. 24, 2014.
Zhang et al. (1995).
Zhu et al., A Handbook of Inorganic Chemical Product, (2008).
Zhang et al., "Biochemistry Experiments," A Teaching Book for National Higher Normal Universities p. 158, Aug. 1995 (with partial translation).
Zhu et al., A Handbook of Inorganic Chemical Product, p. 504, 2008 (with partial translation).

* cited by examiner

*Primary Examiner* — Nikki H. Dees
(74) *Attorney, Agent, or Firm* — Nixon & Vanderhye P.C.

(57) ABSTRACT

The present invention is directed to an iron fortified bouillon concentrate comprising fat, sodium chloride, monosodium glutamate, ferric pyrophosphate, and a citrate buffer. It is directed to a process to prepare an iron fortified bouillon concentrate. This bouillon concentrate allows easy iron supplementation at low cost, without affecting either the original taste or the colour of the bouillon after dissolving and cooking, it does not discolour during shelf life of the bouillon concentrate, and it provides an optimal source of bioavailable iron to the consumer of the food comprising said bouillon concentrate.

9 Claims, No Drawings

IRON SUPPLEMENTATION OF A BOUILLON CONCENTRATE

This application is the U.S. national phase of International Application No. PCT/EP2014/066977 filed 7 Aug. 2014 which designated the U.S. and claims priority to EP Patent Application No. 13181928.6 filed 28 Aug. 2013, the entire contents of each of which are hereby incorporated by reference.

The present invention is directed to an iron fortified bouillon concentrate comprising fat, sodium chloride, monosodium glutamate, ferric pyrophosphate, and a citrate buffer. It is directed to a process to prepare an iron fortified bouillon concentrate. This bouillon concentrate allows easy iron supplementation at low cost, without affecting either the original taste or the colour of the bouillon after dissolving and cooking, it does not discolour during shelf life of the bouillon concentrate, and it provides an optimal source of bioavailable iron to the consumer of the food comprising said bouillon concentrate without affecting its taste.

Food fortification programmes are usually considered the most cost-effective and sustainable approach to combat iron (Fe) deficiency. However, the success of an iron fortification programme depends largely on the careful choice of the source of the iron compound, and of the food matrix. A cheap and highly bio available Fe compound that causes no organoleptic changes would be the ideal fortification compound. Unfortunately, the water soluble iron containing compounds, which are the most bio available, as for example, ferrous sulphate often cause unacceptable colour or flavour changes in the food vehicle and are therefore not used. On the other hand ferric pyrophosphate, at neutral pH, is a known nearly water-insoluble iron compound often used in the food industry to fortify infant cereals and chocolate drink powders. Its main advantage is that it causes no adverse colour and limited flavour changes to food vehicles. It is however, as such poorly bioavailable.

Bouillon cubes comprising a concentrated bouillon are used around the world as a basic cooking ingredient, and especially in developing countries where iron fortification is necessary because of the usual diet, as well as for people on a vegetarian diet. They usually comprise table salt, monosodium glutamate, and optionally fat and starches.

Iron fortified bouillon cubes have been described in the prior art (WO 2009/068378). The bouillon cubes of WO 2009/068378 comprise 30 to 70 wt.-% of a food grade salt, 10 to 45 wt.-% of monosodium glutamate and at least one iron compound selected from the group of ferric sodium EDTA, reduced iron, ferrous lactate, ferric citrate, ferric pyrophosphate, ferrous sulphate monohydrate, and ferric ammonium citrate brown. Specifically, ferric pyrophosphate, Fe sodium EDTA, ferric citrate were shown in this document, to provide good performances related to colour of the bouillon which is identical to a bouillon produced without iron supplementation, and also good performance related to the taste which is unchanged compared to the control. Therefore, iron supplemented bouillon cubes of the prior art comprising ferric pyrophosphate lead to bouillons without significant off colour, and without significant off taste.

However, the bouillon cubes of WO 2009/068378 are unstable upon long term shelf life (more than 9 month) in conditions of high temperatures (above 30° C.) and high humidity (above 60% relative humidity) which are typical of household conditions in countries where these bouillon cubes are to be used. It is believed that this instability (discoloration upon storage) is due to oxidation of the fat catalysed by iron. Moreover, ferric pyrophosphate is very poorly soluble in aqueous solution (final bouillon) resulting in a bouillon containing insoluble forms of iron, thus providing very limited supply of bioavailable iron to the population in need of iron supplementation.

Recently, a micronized dispersible ferric pyrophosphate has been developed for food fortification (U.S. Pat. No. 6,616,955). It is based on ferric pyrophosphate nano particles specially formulated with emulsifiers. This product is dispersible in water, but nevertheless, since the particles are not truly dissolved, the bioavailability of the product remains limited. Moreover, the supplementation cost does not allow the food industry to develop food supplemented in bio available iron suitable for developing countries or targeting populations with low income.

Iron fortified bouillon cubes have also been disclosed in WO 2010/086192. They comprise 5 to 30 wt % fat, 30 to 70 wt. % sodium chloride, 10 to 45 wt % monosodium glutamate, and 0.35 to 7 wt. % of an acid which can be citric acid. The problem of this bouillon cube is that upon dissolving and cooking in an aqueous liquid, it only releases a very limited fraction of bioavailable iron.

There is still a need in the industry to provide iron fortified bouillon concentrates which (i) do not present off-colour during shelf life at high temperature and humidity (as defined above),
(ii) do not result in off-colour of the food product (bouillon) nor of the cooking container upon dilution and cooking of the bouillon concentrate in an aqueous liquid,
(iii) do not significantly increase the cost of iron supplementation compared to non-fortified bouillon concentrates,
(iv) and above all, which allow to deliver, upon dilution and cooking of the bouillon concentrate in an aqueous liquid at least 40 wt-% more preferably at least 80 wt-% of bioavailable iron to the consumer of the resulting bouillon, when the water used to prepare the bouillon has a water hardness in a range from 0 to 3000 ppm, and having a pH higher than 5.2 thus preventing any change in the taste of the bouillon.

The inventors of the present application now surprisingly found a new composition for iron fortification of bouillon concentrates that need heating in aqueous media. These iron supplemented bouillon concentrates are cheap, stable (i.e.: do not loose colour during shelf life of the product under high temperature and high humidity conditions as defined above), and upon heating, iron becomes soluble and highly bioavailable, without affecting the colour or the taste of the final bouillon, whatever hardness of the water is used to create the aqueous liquid (0 to 3000 ppm). Moreover, this composition only comprises components which are readily authorized for food consumption in most countries of the world. Thus, this novel composition provides a very robust way to prevent anaemia by supplying a reliable amount of bioavailable iron to populations in need of it.

Therefore, the present invention provides a bouillon concentrate comprising the following ingredients in the following amounts, based on the total weight of the bouillon concentrate:

5 to 30 wt.-% of fat,
30 to 70 wt.-% of sodium chloride,
10 to 45 wt.-% of monosodium glutamate,
0.015 to 10 wt.-% of ferric pyrophosphate,
7.1 to 40 wt.-% of a citrate buffer being: citric acid and trisodium citrate in a weight ratio of citric acid to trisodium citrate between 0.05 and 0.45, wherein the sum of the weights of said ingredients in the bouillon concentrate sum up to 90 to 100 wt.-%, and wherein the weight ratio of ferric pyrophosphate to said citrate buffer is in a range from 0.005 to 1.5.

Unless specified otherwise in the present specification, all the percentages in the bouillon concentrate composition are based on the total weight of the bouillon concentrate.

A bouillon concentrate is a dehydrated bouillon (French for broth) or stock (in some English speaking countries). It is typically made by dehydrating vegetables, meat stock, a small portion of fat, salt and seasonings. Vegetarian and vegan types are also made. Bouillon concentrates are dried and made available in granular form (consommé) or shaped into small cubes of various sizes but usually about 15 mm wide.

The bouillon concentrate according to the present invention comprises 5 to 30 wt.-% of fat. Fat is used as a binding agent, and the amount of fat depends on the process used to produce the bouillon concentrates. Preferably, in all the embodiments of the present invention, the bouillon concentrate comprises 10 to 25 wt.-% of fat, more preferably, 15 to 20 wt.-% of fat. Fat can be selected from any food grade fat which is either solid or liquid including oil. Preferably, the fat is selected from the group consisting of pork fat, chicken fat, beef fat, olive oil, palm oil, and rape seed oil or mixtures thereof.

The bouillon concentrate according to the present invention comprises 30 to 70 wt.-% of sodium chloride salt, preferably, 40 to 60 wt.-%, more preferably, 45 to 55 wt.-% of sodium chloride salt. Optionally, sodium chloride salt may also be partially replaced by another food grade salt selected from potassium or ammonium chloride.

The bouillon concentrate according to the present invention comprises 10 to 45 wt.-% of monosodium glutamate as a flavour enhancement additive. Preferably, for all the embodiments of the present invention, the amount of monosodium glutamate is in the range of 20 to 35 wt.-%, even more preferably, in the range of 25 to 30 wt.-%.

The amount of ferric pyrophosphate in the bouillon concentrate according to the present invention is in a range from 0.015 to 10 wt.-%, preferably in a range from 0.02 wt.-% to 5 wt.-%, more preferably, in a range from 0.05 to 2 wt.-%. Ferric pyrophosphate also called diphosphoric acid iron (III) salt (CAS: 10058-44-3), can be purchased from Spectrum Chemical or Dr. Paul Lohmann. The particle size of the ferric pyrophosphate will influence the required heating time of the bouillon concentrate in aqueous media to obtain complete dissolution of the ferric pyrophosphate with the citrate buffer. The larger the particle size, the longer heating will be required. Therefore, preferred ferric pyrophosphate particle size for use in the composition according to the present invention, have an average particle size between 1 to 60 micrometers. Even more preferred ferric pyrophosphate is micronized ferric pyrophosphate with an average particle size of 1 to 5 micrometers as measured by laser diffraction methods known in the art.

The bouillon concentrate according to the present invention comprises 7.1 to 40 wt.-%, preferably 7.5 to 20 wt.-% of citrate buffer. Citrate buffer whenever used in the context of the present invention means a mixture of citric acid and trisodium citrate.

Trisodium citrate (CAS: 68-04-2) can be purchased from Spectrum Chemical. Suitable citrate buffer for the composition according to the present invention is selected view of its power to solubilise ferric pyrophosphate upon heating of the bouillon concentrate in presence of water having a water harness comprised between 0 and 3000 ppm. Said citrate buffer being limited to: citric acid and trisodium citrate in a weight ratio of citric acid to trisodium citrate between 0.05 and 0.45, preferably citric acid and trisodium citrate in a weight ratio of citric acid to trisodium citrate between 0.2 and 0.3.

The weight ratio of ferric pyrophosphate to citrate buffer in the bouillon concentrate according to the present invention is also a critical parameter to ensure iron solubilisation in the bouillon. The weight ratio of ferric pyrophosphate to citrate buffer must be in a range from 0.005 to 1.5, preferably, in a range from 0.01 to 1, more preferably, in a range from 0.05 to 0.7 in view of the optimal ratio needed to solubilise ferric pyrophosphate upon heating of the bouillon concentrate in presence of water.

The bouillon concentrate according to the present invention may further comprise 1 to 20 wt.-% of starch which is either native (such as potato starch or corn starch) or modified (such as maltodextrin). Moreover, flour may also be used instead of starch.

Therefore, the most preferred bouillon concentrate according to the present invention comprises 10 to 25 wt.-% of fat, 40 to 60 wt.-% of sodium chloride, 20 to 35 wt.-% of monosodium glutamate, 0.02 to 5 wt.-% of ferric pyrophosphate, 7.1 to 20 wt.-% of a citrate buffer being citric acid and trisodium citrate in a weight ratio of citric acid to trisodium citrate between 0.2 and 0.3, wherein the weight ratio of ferric pyrophosphate to citrate buffer is in a range from 0.05 to 0.7.

The bouillon concentrates according to the present invention may further comprise 1 to 20 wt.-% herbs, spices and other seasoning. Herbs and spices are preferably selected from parsley, oregano, garlic powder, onion powder, paprika, white pepper, curry.

In another embodiment, the bouillon concentrates according to the present invention further comprise vitamins and minerals commonly added to such products. The amount is comprised between 10 to 40% of the recommended daily allowance (RDA) per serving. Preferred additional mineral is zinc, and preferred additional vitamins are vitamin A, vitamin B2, vitamin B6, folic acid, vitamin B12, vitamin E, vitamin B1, calpan, biotin and niacin.

The bouillon concentrates according to the present invention may further comprise natural colorants selected from dried curcuma powder, and/or carotenoids, preferably beta-carotene and/or lutein, at levels of 0.1-5 ppm to provide an appealing colour to the bouillon concentrate.

The bouillon concentrates according to the present invention are preferably in a dry form. Dry means in the present context a water activity lower than 0.65. The concentrate may be dried as a granulate by conventional drying technologies, or shaped in the form of a cube. A "cube" is not limited to a shape in a typical cube form, but is intended to comprise any shape of the bouillon cube. Preferably the present invention relates to a bouillon cube in the form of a cube or a tablet. The bouillon cube according to the present invention may have a weight of about 2 to 15 grams, preferably 3 to 10 grams.

The bouillon concentrates according to the present invention are extremely stable when stored in high temperature and high humidity. Moreover, upon mixing with water and heating, ferric pyrophosphate completely dissolves with the help of the citrate buffer. The heating needs to be performed by heating the bouillon concentrate in an aqueous food composition at a temperature comprised between 80 to 120° C. for 5 to 120 minutes. Preferably the heating step is performed by boiling around 100° C. under atmospheric pressure until ferric pyrophosphate is completely solubilised with the citrate buffer. Usually this is done within 20 to 60 minutes. The heating step can optionally be performed under pressure. In such a case, the person skilled in the art will of course reduce the heating time accordingly depending on the pressure and temperature applied.

In another embodiment, the present invention provides the bouillon concentrate according to the present invention, wherein the bouillon concentrate upon dissolving in boiling water results in a bouillon with more than 40 wt.-% of the iron, preferably more than 80 wt.-% of the iron in a dissolved bioavailable form when prepared with water having hardness ranging from 0 to 3000 ppm.

In yet another embodiment, the present invention provides a ready-to-eat food composition having a pH in a range from 5.2 to 8, comprising a bouillon concentrate according to the present invention, wherein said bouillon concentrate has been dissolved in a food product by heating at a temperature of 80 to 120° C. for 5 to 120 minutes. Preferably the heating step is performed by boiling around 100° C. under atmospheric pressure until ferric pyrophosphate is completely solubilised with the citrate salt. Usually this is done within 20 to 60 minutes.

Bouillon concentrates are prepared according to any method know to the person skilled in the art. In a preferred embodiment, bouillon concentrates according to the present invention are prepared by a process comprising the following steps:

a) preparing a mixture comprising 5 to 30 wt.-% of fat, 30 to 70 wt.-% of sodium chloride, 10 to 45 wt.-% of monosodium glutamate, 0.015 to 10 wt.-% of ferric pyrophosphate, and 7.1 to 40 wt.-% of a citrate buffer, wherein the citrate buffer being: citric acid and trisodium citrate in a weight ratio of citric acid to trisodium citrate between 0.05 and 0.45, wherein the weight ratio of ferric pyrophosphate to said citrate buffer is in a range from 0.005 and 1.5, wherein the sum of the weights of said ingredients in the bouillon concentrate sum up to 90 to 100 wt.-% b) granulating or shaping the mixture resulting from step a).

Preferably, the shaping of the bouillon concentrates is carried out by pressing.

The invention is further illustrated by the following examples.

EXAMPLES

Example 1: Bouillon Cube with 4 g for One Serving (250 ml)

| Vegetable fat | 7 wt.-% |
|---|---|
| Sodium Chloride | 47 wt.-% |
| Monosodium Glutamate | 15 wt.-% |
| Sugar | 5.24 wt.-% |
| Flavour incl Hydrolysed plant protein | 14 wt.-% |
| Ferric Pyrophosphate micrn. | 0.3 wt.-% |
| Citric acid | 2.11 wt.-% |
| Trisodium Citrate | 9.35 wt.-% |

Put into about 250 ml water and boil for 20 minutes. Then consume.

Example 2: Bouillon Cube with 4 g for One Serving (250 ml)

| Beef fat stabilized | 10 wt.-% |
|---|---|
| Vegetable fat | 10 wt.-% |
| Sodium Chloride | 35 wt.-% |
| Monosodium Glutamate | 10 wt.-% |
| Dried Herbs | 1 wt.-% |
| Flavour incl Hydrolysed plant protein | 3 wt.-% |
| Ferric Pyrophosphate micrn. | 0.3 wt.-% |
| Citric Acid | 1.58 wt.-% |
| Trisodium Citrate | 6.97 wt.-% |
| Maltodextrin | 22.15 wt.-% |

Put into about 250 ml water and boil for 20 minutes. Then consume.

Example 3: Bouillon Cube with 4 g for One Serving (250 ml)

| Beef fat stabilized | 10 wt.-% |
|---|---|
| Vegetable fat | 10 wt.-% |
| Sodium Chloride | 35 wt.-% |
| Monosodium Glutamate | 10 wt.-% |
| Dried Herbs | 1 wt.-% |
| Flavour incl Hydrolysed plant protein | 3 wt.-% |
| Ferric Pyrophosphate micrn. | 0.3 wt.-% |
| Citric Acid | 1.6 wt.-% |
| Trisodium Citrate | 8.8 wt.-% |
| Potato Starch | 20.3 wt.-% |

Put into about 250 ml water and boil for 10 minutes. Then consume.

Example 4: Effect of the Citrate Buffer on Iron Release

Measurement of Iron Released During Broth (Bouillon) Preparation

In order to detect the iron released as free $Fe^{2+}$ and $Fe^{3+}$ during the bouillon preparation, a dedicated methodology was developed (by adapting an already existing methodology for the iron detection in drinking water; Manual, 2008). The methodology uses the reaction between ferrous ions and 1,10-phenanthroline to form a red complex. The molar absorptivity of the complex is 11100 at 508-510 nm. The intensity of the color is independent of pH in the range 2 to 9, moreover the complex is very stable and the color intensity does not change appreciably over long period of time. Beer's law is obeyed.

Because the iron must be in the ferrous state, a reducing agent is added before the color is developed. Hydroxylamine chloride was chosen as reducing agent.

Reagents and Procedure

Acetate buffer: 10 grams of sodium-acetate trihydrate (Sigma, USA) are weighted and poured into a volumetric flask. Nanopure water is then added up to 1000 mL (solution pH=8.1), subsequently the desired pH is adjusted by dropping acetic acid (10% solution) until pH 6.8 is reached (a Methrom pHmeter was used to continuously monitor the pH value).

Reducing agent solution: one gram of Hydroxylamine Hydrochloride (Sigma, USA) is weighted and poured into a volumetric flask, subsequently nanopure water is added up to 100 mL.

Dye solution: 100 mg of 1,10-phenanthroline (Sigma, USA) is weighted and poured into a volumetric flask, subsequently nanopure water is added up to 100 mL. The solution is magnetically stirred until complete dissolution of the 1,10-phenanthroline.

Procedure:
- Pipette 3 of filtered (syringe 250 micrometers disposable filter) bouillon in a 10 ml plastic tube (Corning 430791 or Falcon 352097)
- Add 5 ml sodium-acetate buffer (pH 6.8)
- Add 1 ml Hydroxilamine Hydrochlorate solution
- Add 1 ml of 1,10-phenanthroline solution
- Shake the tube by hand and let them stand for 10 minutes with occasional shaking.
- The sample's spectrophotometric absorption is then measured with a spectrophotometer (Perkin Elmer Lambda 35) by scanning the wavelength from 390 nm to 700 nm (maximum absorbance ~508 nm)
- The plain bouillon without iron is used in order to prepare the blank (reference solution)

Calibration Curve

Calibration curves were built by using each type of analyzed and prepared bouillon (in order to avoid differences in matrix effects). The desired amounts of iron ions were added to the analyzed bouillon by spiking standard iron 1000 ppm solution (Sigma Aldrich, Saint Louis, USA).

Each calibration curve (Absorbance at 510 nm as a function of $Fe^{3+}$ concentration) was a final interpolation of three replicates performed during different days and by preparing every time fresh samples and fresh reagents. Moreover each replicate was performed by replicating (twice) each iron concentration measurement.

Iron Release During Cooking Conditions
(Spectrophotometric Test Based on the Color Change of 1,10-Phenanrtroline in Presence of Iron Ions):

First 250 mL of water were heated up to or 96° C., then a bouillon cube was added under stirring condition. Time 0 was set when all the bouillon cube was dissolved and then one aliquot (3 mL) was taken every 15 minutes up to one hour.

Table 1 shows a composition according to present invention (Fe; C:TSC) compared to a similar composition without citric acid-Trisodium citrate (Fe).

| INGREDIENTS | (Fe) | (Fe; C-TSC) |
| --- | --- | --- |
| Sodium Chloride | 47.41 | 47.41 |
| Monosodium glutamate | 15.27 | 15.27 |
| Hydrolysed vegetable protein | 14.07 | 14.07 |
| Sugar | 5.57 | 4.91 |
| Palm fat | 7.18 | 7.18 |
| Citric acid | — | 1.38 |
| Trisodium citrate | — | 8.75 |
| Fe-Pyrophosphate micrn. | 0.60 | 0.60 |
| Patato Starch | 9.90 | 0.44 |
| Total | 100 | 100 |

The above two bouillon cubes were then cooked into Nanopure water (close to a water harness of 0 ppm) as described above, and the iron release calculated as a percentage of therotecal fe content. (See table 2).

TABLE 2

Percentage of iron release as a function of time in the two bouillons prepared with the two above mentioned bouillon cubes.

| Time (Min) | 0 | 15 | 30 | 45 | 60 |
| --- | --- | --- | --- | --- | --- |
| Fe; C-TSC | 34 | 55 | 72 | 79 | 78 |
| Fe; | 1 | 3 | 5 | 6 | 8 |

Final pH in the two bouillons were 5.64 for (Fe) and 5.83 for (Fe; C-TSC).

Example 5: Effect of the Amount of Citrate on Iron Release

Experimental conditions are exactly as in above example 4. Table 3 shows the two bouillon cubes as comparative example.
A: Bouillon cube with 6.9% citrate buffer
B: Bouillon cube with 11.5% citrate buffer

TABLE 3

Bouillon cube compositions:

| INGREDIENTS | (6.9% citrate) | (11.5% citrate) |
| --- | --- | --- |
| Sodium Chloride | 47.41 | 47.41 |
| Monosodium glutamate | 15.27 | 15.27 |
| Hydrolysed vegetable protein | 14.07 | 14.07 |
| Sugar | 5.57 | 4.22 |
| Palm fat | 7.18 | 7.18 |
| Citric acid | 1.25 | 2.50 |
| Trisodium citrate | 5.43 | 9.35 |
| Fe-Pyrophosphate micrn. | 0.30 | 0.30 |
| Patato Starch | 3.52 | — |
| Total | 100 | 100 |

TABLE 4

Percentage of iron release as a function of time in the two bouillons prepared with the two above mentioned bouillon cubes.

| Time (Min) | 0 | 15 | 30 | 45 | 60 |
| --- | --- | --- | --- | --- | --- |
| 6.9% citrate buffer | 0 | 5 | 3 | 4 | 6 |
| 11.5% citrate buffer | 0 | 54 | 88 | 99 | 100 |

Final pH in the two bouillons were 5.13 for (6.9% citrate buffer) and 5.62 for (11.5% citrate buffer).

Example 6: Effect of the Citrate Buffer on Iron Release

Iron Release During Cooking Conditions

Bouillon cubes of 4 g were prepared by mixing 3.5 grams of the bouillon powder (table 5) with the citric acid buffer ingredients comprising 65 mg citric acid and 290 mg trisodium citrate and 12 mg of iron pyrophosphate (3.3 mg iron per bouillon cube/serving—250 mL—). In order to reach the final bouillon cube 4 grams, potato starch was used as "filler".

First 250 mL of water were heated up to or 96° C., then a bouillon cube was added under stirring condition. Time 0 was set when all the bouillon cube was dissolved and then one aliquot (3 mL) was taken after 1 hour.

Table 5 shows a composition according to present invention comprising a citrate buffer made of citric acid and trisodium citrate (C:TSC).

| INGREDIENTS | (Fe; C-TSC) |
|---|---|
| Sodium Chloride | 54 |
| Monosodium glutamate | 17 |
| Hydrolysed vegetable protein | 16 |
| Sugar | 6.2 |
| Palm fat | 6.8 |
| Total | 100 |

The above bouillon cube was then cooked for 1 hour into water of different hardness as described above, and the iron release calculated as a percentage of theoretical Fe content (see Table 6).

As shown below (Table 6), water type (harness) and citric buffer source, clearly influence the percentage of iron ions released (from the iron pyrophosphate) after one hour of cooking procedure.

| Water hardness | pH of the bouillon | % iron release |
|---|---|---|
| 90 ppm | 5.3 | 100 |
| 250 ppm | 6.0 | 75 |
| 550 ppm | 5.3 | 40 |

The invention claimed is:

1. Bouillon concentrate comprising the following ingredients in the following amounts, based on the total weight of the bouillon concentrate:
   5 to 30 wt.-% of fat,
   30 to 70 wt.-% of sodium chloride,
   10 to 45 wt.-% of monosodium glutamate,
   0.015 to 10 wt.-% of ferric pyrophosphate,
   7.1 to 40 wt.-% of a citrate buffer being: citric acid and trisodium citrate in a weight ratio of citric acid to trisodium citrate between 0.05 and 0.45,
   wherein the sum of the weights of said ingredients in the bouillon concentrate sum up to 90 to 100 wt.-%,
   wherein the weight ratio of ferric pyrophosphate to said citrate buffer is in a range from 0.005 to 1.5, and
   wherein the bouillon concentrate has a water activity lower than 0.65.

2. The bouillon concentrate according to claim 1, wherein the fat is selected from the group consisting of pork fat, chicken fat, beef fat, olive oil, palm oil, and rape seed oil or mixtures thereof.

3. The bouillon concentrate according to claim 1, wherein the weight ratio of ferric pyrophosphate to citrate buffer is in a range from 0.05 to 0.7.

4. The bouillon concentrate according to claim 1, wherein the citrate buffer is citric acid and trisodium citrate in a weight ratio of citric acid to trisodium citrate between 0.20 and 0.3.

5. The bouillon concentrate according to claim 1, wherein ferric pyrophosphate is in the form of particles having an average particle size in a range from 1 to 5 micrometers as measured by laser diffraction.

6. The bouillon concentrate according to claim 1, wherein 4 g of the bouillon concentrate upon dissolving in 250 mL boiling water results in a bouillon with more than 40 wt.-% of the iron in a dissolved bioavailable form when prepared with water having hardness ranging from 0 to 3000 ppm.

7. A process to prepare the bouillon concentrate according to claim 1, comprising the following steps:
   (a) preparing a mixture comprising 5 to 30 wt.-% of the fat, 30 to 70 wt.-% of the sodium chloride, 10 to 45 wt.-% of the monosodium glutamate, 0.015 to 10 wt.-% of the ferric pyrophosphate, and 7.1 to 40 wt.-% of the citrate buffer, and thereafter
   (b) granulating or shaping the mixture resulting from step (a).

8. The process according to claim 7, wherein the shaping according to step (b) is carried out by pressing the mixture.

9. A ready-to-eat food composition having a pH in a range from 5.2 to 8, wherein the ready-to-eat food composition comprises the bouillon concentrate according to claim 1 which has been dissolved in a food product by heating the food product with the bouillon concentrate therein at a temperature of 80 to 120° C. for 5 to 120 minutes.

* * * * *